Aug. 22, 1961

K. F. RIESE ET AL 2,997,098

SEALING APPARATUS

Filed May 2, 1956

INVENTORS
KARL F. RIESE
KENNETH R. SAGMO
BY

*Robert E. Horn*

ATTORNEY

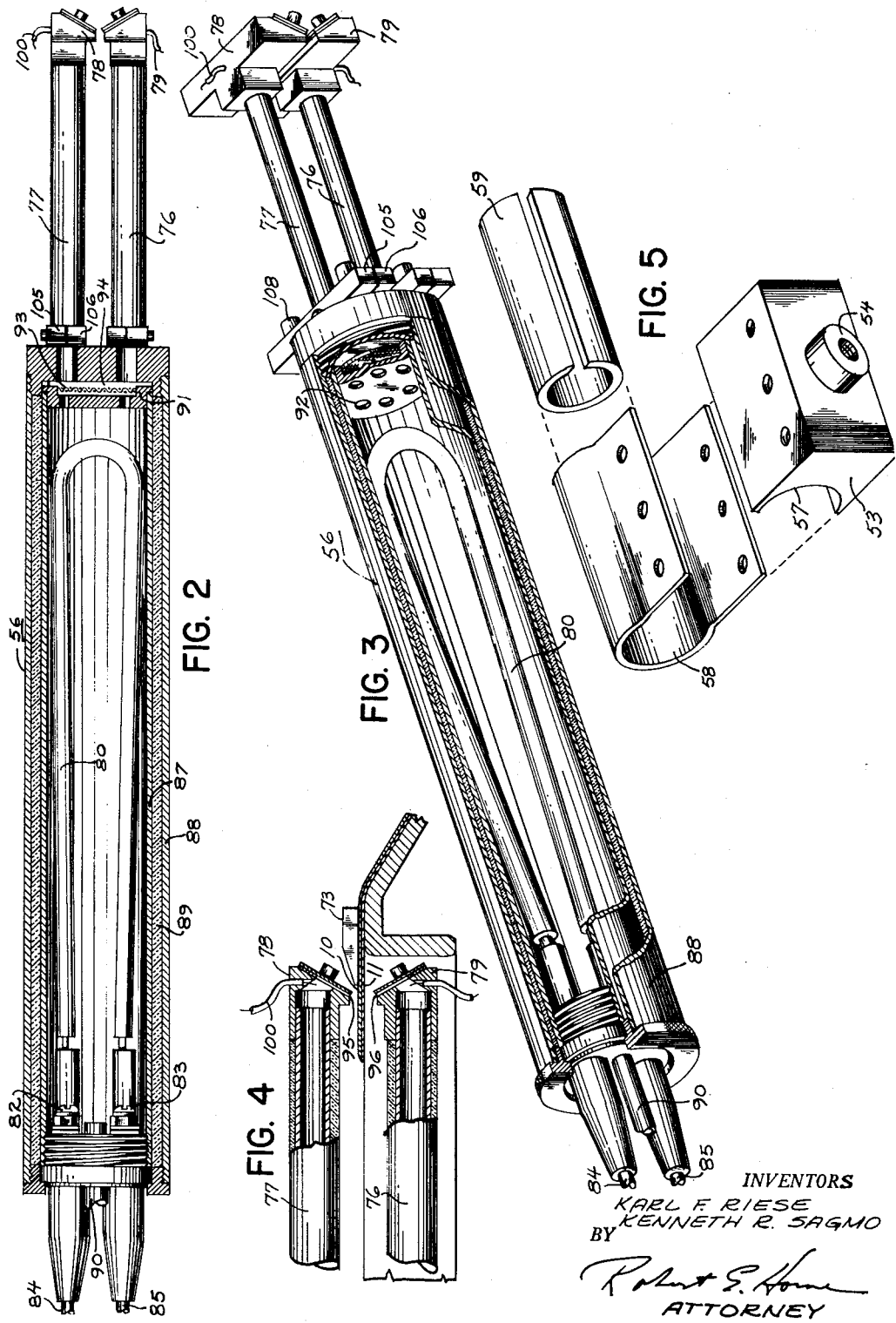

Aug. 22, 1961  K. F. RIESE ET AL  2,997,098
SEALING APPARATUS
Filed May 2, 1956  3 Sheets-Sheet 3

INVENTOR.
KARL F. RIESE
KENNETH R. SAGMO
BY
Robert E. Horne
ATTORNEY

//  
United States Patent Office 2,997,098  
Patented Aug. 22, 1961

2,997,098  
SEALING APPARATUS  
Karl F. Riese, St. Paul, and Kenneth R. Sagmo, Minneapolis, Minn., assignors to General Mills, Inc., a corporation of Delaware  
Filed May 2, 1956, Ser. No. 582,129  
1 Claim. (Cl. 154—42)

This invention relates to an improved apparatus for joining sheets of thermoplastic material by employing a flow of heated inert gas to form an improved seam.

This invention represents an improvement over the apparatus described and disclosed in Alan A. Reid application Serial No. 297,335, filed July 5, 1952, and assigned to the same assignee, now Patent No. 2,786,511.

An object of our invention is to provide an apparatus for applying a sheet of heated gas at an angle to opposing sides of layers of thermoplastic material to form a seam thereon.

A further object of our invention is to provide a heating chamber for heating said gas wherein the heating element is detachable therefrom.

Another object of our invention is to provide a heated cutting means for the thermoplastic material for initially cutting the material and the seam being formed by hot gases applied by a plurality of heads thereafter.

Another object of our invention is to provide a sealing jet assembly means which may be adjusted angularly in relation to the longitudinal movement of the over-all sealing jet assembly means to provide seals of varying widths.

Other objects and advantages will become apparent in the following specification and claims taken in connection with the drawings in which:

FIG. 2 is a side elevation of the heating element within the heating chamber;

FIG. 3 is an isometric view of the heating element within the heating chamber for heating gases to be forced out the plurality of heads;

FIG. 4 is a diagrammatic sectional view of the gas ejecting head and its relation to the thermoplastic material;

FIG. 5 is an isometric detail of the supporting means for the heating chamber;

Figure 1:
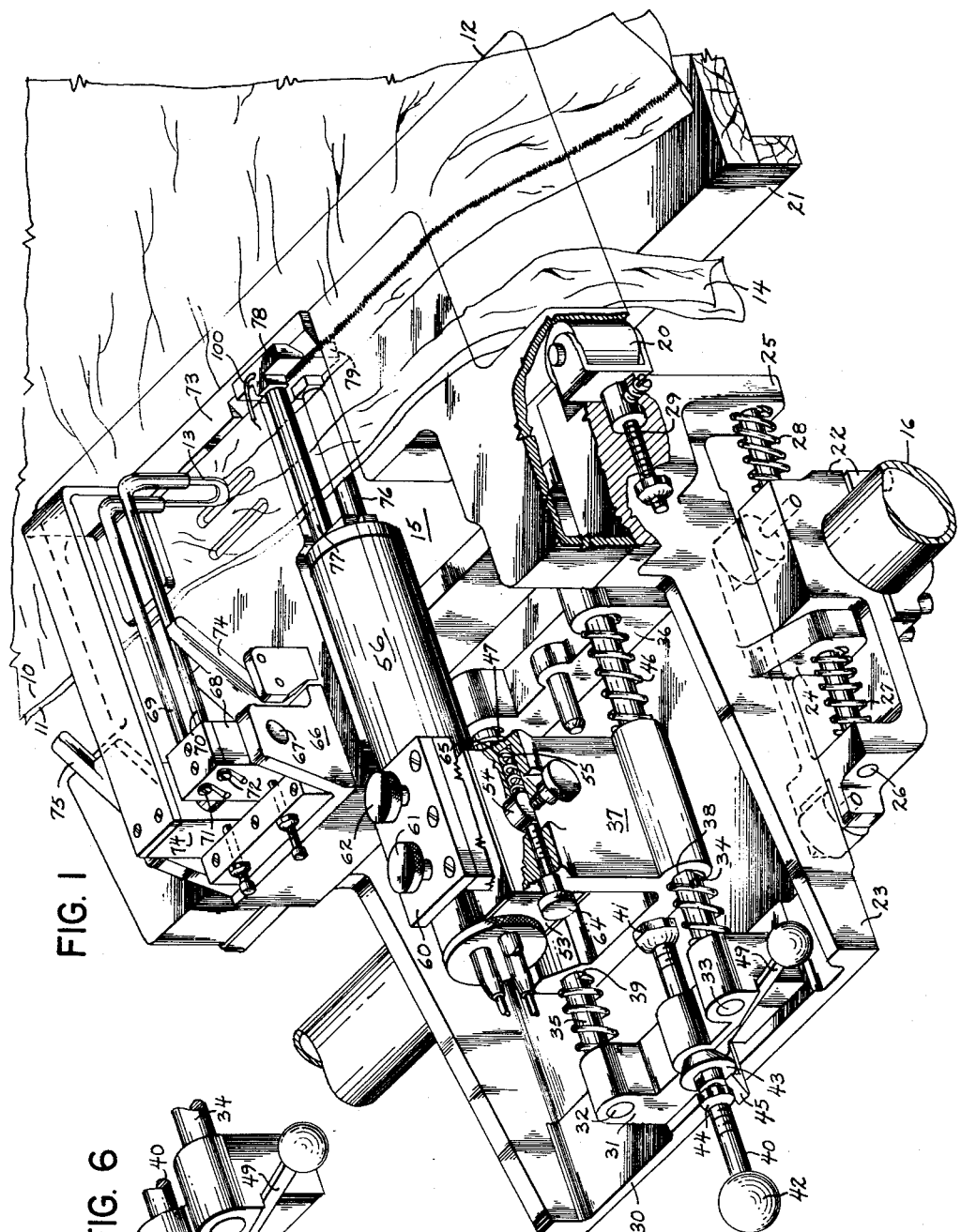
FIGURE 1 is an isometric view of the sealing and cutting means and the carriage therefor cooperating with a table for supporting the thermoplastic material.
Figure 6:
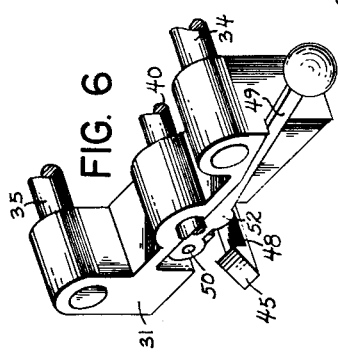
FIG. 6 is an isometric detail of the quick release means for the sealing means.

In the preferred embodiment shown in the drawings, two lengths of sheet thermoplastic material are to be joined together at their edges by a seam. The mechanism is capable of seaming various thermoplastic materials well known to the art. For purposes of description only, polyethylene will be taken as an example. In thermoplastic material available commercially, the material is ordinarily supplied in lengths or rolls and for many uses it is necessary to join a number of lengths along the edges to obtain a wider over-all sheet. Often the edges are trimmed to a definite shape and when joined will form a three dimensional object, that is, containers, balloons, etc. To be able to withstand stresses the seam must be smooth on the edge adjoining the body of the thermoplastic sheet. When the sheets are separated and pulled away from each other, small irregularities or scallops in the seam will form points of stress concentration and tear the material or cause the seam to fail. If the material is to be used in an article which must withstand stress, or be impervious to liquids or impervious to gases such as in the case of a balloon, it is highly important that the seam be as smooth and as strong as possible to avoid the development of points of leakage when the material is stressed. In joining the sheets, for economy and for rapid production, it is desirable that the seam be formed at a high rate of speed. Yet, because of the demands of strength and permeability, the seam must be completely continuous with no gaps along its length. Thus the present invention forms a continuous seam which is smooth and strongly bonded and the seam is made at a relatively high rate of speed as will be discussed hereinafter.

Referring now to the drawings, the sheets of material 10 and 11 rest on a support 12, the upper sheet 10 overlying the sheet 11. In forming articles having a specific shape, it is necessary to trim the edges of the sheets. This is accomplished by a heated severing wire 13 which passes through the layers of material, the heat of the wire fusing the material along the desired path and simultaneously separating a strip 14 which is cut from the edge of the material by the wire. The strip 14 is pulled manually from the remainder of the material as it is being cut.

Figure 9:
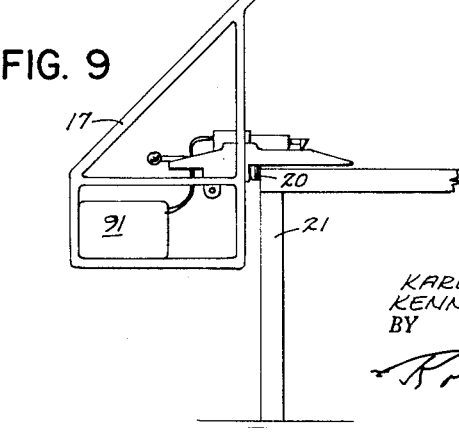
FIG. 9 is an end view of the sealing means mounted in a carriage suspended from a trolley means shown in relation to a table.

In FIG. 1, the sealing apparatus designated generally as 15 is supported on a tubular support member 16 which forms a part of the over-all carriage 17 shown in FIG. 9, supported from a track 18 by a trolley means 19.

Rollers 20 engage the edge of table 21 so that the shaping of the seam and cutting are largely determined by the shape of the table edge. As shown in FIG. 9 the weight of carriage 17 acts to keep rollers 20 in engagement with the table as the carriage is moved therealong either manually or by a power means (not shown).

A clamping unit 22 surrounds tubular member 16 for supporting frame unit 23 as by members 24, 25 and pin 26. Springs 27 and 28 surround pin 26 to allow relative movement of the frame 23 with respect to tubular member 16. The rollers 20 are likewise adjustable by threaded means 29.

A cross supporting member 30 of frame 23 includes bracket 31 provided with openings 32 and 33 into which pins 34 and 35 are inserted. A bracket 36 mounted on frame 23 supports the other end of pins 34 and 35. Slidably mounted on pins 34 and 35 is an L-shaped bracket 37 provided with openings 38 and 39 therethrough. Bracket 37 is adjusted longitudinally of the pins 34 and 35 by threaded adjustment rods 40 provided with a flat end portion 41 for contacting bracket 37, and a knob 42 to facilitate the positioning of rod 40. A frusto-conical sleeve 43 is threadably adjustable along the length of rod 40, and the position of sleeve 43 is secured by nut 44. To position bracket 37, the sleeve 43 is threadably positioned along rod 40 to the desired position. The rod 40 is then pushed inwardly by knob 42 until sleeve 43 rides over latching member 45. The knob is then released, and springs 46 and 47 urge bracket 37 toward bracket 31 and sleeve 43 against the inner face 48 of latching member 45. To release sleeve 43 from latching member 45, handle 49, pivoted as at 50, is urged downwardly to move raised portion 52 of handle 49 against latching member 45 to depress it downward to remove face 48 from sleeve 43 to allow bracket 37 to move to its fullest extent toward bracket 31.

Mounted on bracket 37 is chamber mounting block 53, provided with a threaded extended position 54 which rests in a groove 55. Further, heating chamber 56 is engageable with the concave surface 57 of block 53, and said chamber 56 is held in relation to block 53 by a clamping member 58 best shown in FIG. 5. Surrounding chamber 56 at the clamped portion is a heat insulating sleeve 59 of asbestos or other suitable material. Secured to the top of bracket 37 is a plate 60 through which pass knurled members 61 and 62. Members 61 and 62 extend through plates 60 and engage clamping member 58 where it contacts the uper portion of block 53. By turning either member 61 or 62 more than the other, a pivotal action occurs at portion 54 which allows for a vertical positioning of the extended end of chamber 56. Horizontal adjustment of block 53 is accomplished by the turning of threaded member 63 into portion 54. The canting or angular adjustment of chamber 56 is made by adjustment of the threaded member 64 against portion 54 and spring 65.

Also supported on frame 23 is the supporting means for heating wire 13. Such means consists of a supporting bracket 66 through which is passed a pivot pin 67. Mounted on pin 67 is block 68 to which is attached supporting tubes 69 and 70 through which heated wire 13 passes having electrical terminals 71 and 72.

A guide member 73 is attached to a block 74 pivotally mounted on pin 67. The heated wire 13 and guide member 73 may be raised or lowered by movement of handles 74 and 75, respectively.

Extending from the end of chamber 56 and communicating with the interior thereof are tubes 76 and 77 to which are attached head jet assemblies 78 and 79 shown in greater detail in FIGS. 2, 3, 4, and 7.

Thus the preferred embodiment discloses head jet assemblies 78 and 79 on opposing sides of the thermoplastic sheets 10 and 11 to operate in conjunction with heated wire 13 for cutting and forming a seal as will be hereinafter described.

Referring now to FIG. 2, the heating chamber 56 is provided with a replaceable resistance heating unit 80 which is U-shaped and secured to a threaded head member 81 having terminals 82 and 83 to which wires 84 and 85 are attached. Chamber 56 is made up of two metallic cylinders 87 and 88 having an insulating layer 89 therebetween. A gas, such as air or nitrogen, is supplied through tube 90 from a compressor 91. The gas passing to the heating chamber 56 is heated by heating element 80 as the gas passes therearound and in the particular embodiment disclosed, the gas is heated in the range of 375–400° F.

The heated gas is passed through a baffle plate 91 mounted at the end of cylinder 87 and provided with openings 92. The gas then passes through a fine mesh filter screen 93 which serves to prevent particles of foreign matter from being carried along with the gas. From the filter screen chamber 94, the gas flows to tubes 76 and 77 to head jet assemblies 78 and 79 from which the heated gas is directed through outlets 95 and 96 to the opposite sides of thermoplastic layers 10 and 11. The size of the outlets may be, for example, .006 inch by one inch to, in effect, direct a sheet of gas from each outlet at an angle to the thermoplastic material. The heat of the gas must be sufficient to fuse the inner face of the layers of material and may be, for example, 375° F. when the heads are passed over the material by the carriage at a rate of 42 feet per minute. The gas pressure is on the order of 15 p.s.i. to assist in holding the two layers of material in contact and the direction in which the heated gas is directed against the layers of material tends to stretch out the material to avoid wrinkling and pin holes in the seal being formed.

Figure 7:
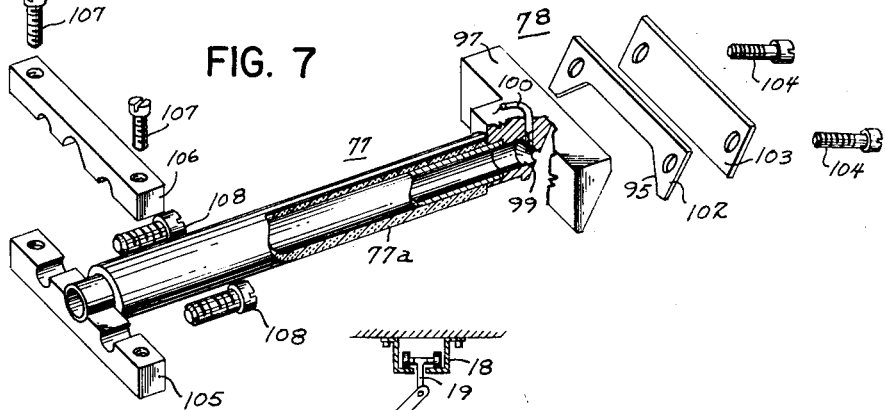
FIG. 7 is an isometric detail of one of said gas ejection heads.

A further detail of the tube and heat jet assembly is shown in FIG. 7 where the main block portion 97 of the head 78 is provided with an inclined surface 98 and a tapered bore 99. A thermocouple 100 is shown inserted into the block portion to detect the temperature of the gas flowing therethrough. The outlet portion 102 is attached to block 98 by a plate 103 and fasteners 104. If it is desired to increase the size of the outlet 95 a shim member may be placed between portion 102 and plate 103. To decrease the outlet, it would be necessary to decrease the thickness of portion 102.

Figure 8:
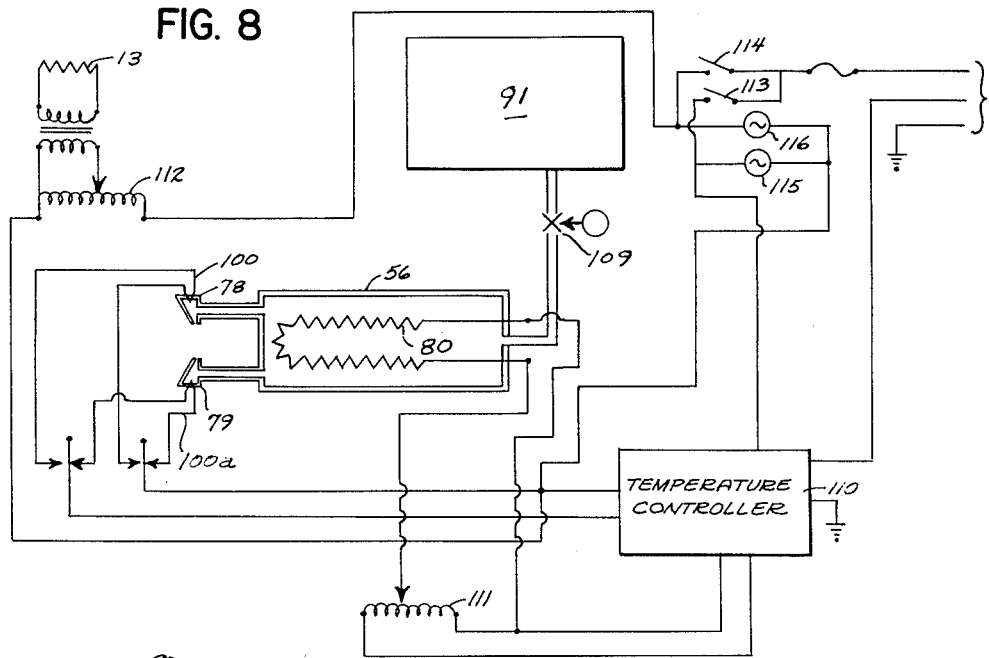
FIG. 8 is a diagrammatic view of the electrical circuit for the cutter and gas heating means.

The tube 77 is shown provided with an insulating portion 77a and is removably mounted in a pair of recessed blocks 105 and 106 which are secured near the end of the tube by fasteners 107 and secured to the end of cylinder 56 by fasteners 108. In FIG. 8 a diagrammatic circuit is shown wherein the compressor 91 supplies the air, for example, through a pressure regulating valve 109 to the heating chamber 56 and electrical power is supplied to the heating element 80 which is controlled by a temperature controller 110 of the type well known in the art in conjunction with a thermocouple 100 or 100a and said temperature may be manually regulated by a variac 111. The cutter 13 is also supplied with electrical power and may be manually regulated by a variac 112. The heating element 80 is energized by depressing switch 113 and the cutter is energized by depressing switch 114 with corresponding lights 115 and 116 being lighted to indicate that the respective units are energized.

Thus I have provided a sealing apparatus which applies a jet of heated gas on opposite sides of a plurality of layers of thermoplastic material, the amount of heat being dependent upon the amount necessary to fuse the inner face of the thermoplastic material and relating to the speed at which the sealing apparatus is passed over the thermoplastic material to form a seam. The head jet assemblies as hereinabove described may be adjusted horizontally and vertically in respect to the thermoplastic material with an adjustable adjustment being provided to cant or secure the head jet assemblies in relation to the longitudinal movement of the sealing apparatus to provide a wider seam than when the head jet assemblies are parallel to the longitudinal movement of the sealing apparatus.

Since many variations of the exact details of construction shown in the drawings will occur to persons skilled in the art in view of the teachings of this application, it is intended that this invention should not be limited to the exact structure shown but only by the scope and spirit of the attached claim.

We claim:

An apparatus for forming a seam to join layers of thermoplastic sheet material comprising a generally horizontal flat support adapted to support a pair of superimposed sheets of thermoplastic material, means for severing said sheets along a desired path, a first jet assembly having an inclined passage leading downwardly for directing heated gas against the upper surface of the upper sheet, a second jet assembly beneath said first jet assembly having an inclined passage leading upwardly for directing heated gas against the lower surface of the lower sheet, the inclination of said passages being at respective angles relative to said surfaces of said material so that each assembly imparts a vertical jet component toward said sheets and a horizontal component toward said path along which said sheets have been severed.

References Cited in the file of this patent

UNITED STATES PATENTS

| | | |
|---|---|---|
| 1,141,932 | Byrnes | June 8, 1915 |
| 1,752,139 | Anderson | Mar. 25, 1930 |
| 2,423,237 | Haslacher | July 1, 1947 |
| 2,486,759 | Pfeiffer | Nov. 1, 1949 |
| 2,627,213 | Nye | Feb. 3, 1953 |
| 2,711,779 | Carland | June 28, 1955 |
| 2,732,881 | Anderle | Jan. 31, 1956 |
| 2,781,079 | Ruby | Feb. 12, 1957 |
| 2,786,511 | Reid | Mar. 26, 1957 |